US009747936B1

(12) United States Patent
Eklund (10) Patent No.: US 9,747,936 B1
(45) Date of Patent: Aug. 29, 2017

(54) DATA STORAGE DEVICE FILTERING SENSOR SIGNAL TO OPTIMIZE SHOCK AND THERMAL POP DETECTION

(71) Applicant: Western Digital Technologies, Inc., Irvine, CA (US)

(72) Inventor: Erik J. Eklund, Newport Beach, CA (US)

(73) Assignee: Western Digital Technologies, Inc., San Jose, CA (US)

(*) Notice: Subject to any disclaimer, the term of this patent is extended or adjusted under 35 U.S.C. 154(b) by 48 days.

(21) Appl. No.: 15/246,364

(22) Filed: Aug. 24, 2016

(51) Int. Cl.
*G11B 5/55* (2006.01)
*G11B 5/596* (2006.01)
*G11B 19/04* (2006.01)

(52) U.S. Cl.
CPC .......... *G11B 5/5565* (2013.01); *G11B 5/5547* (2013.01); *G11B 5/5582* (2013.01); *G11B 5/59622* (2013.01); *G11B 5/59694* (2013.01); *G11B 19/042* (2013.01); *G11B 19/046* (2013.01)

(58) Field of Classification Search
CPC ....... G11B 5/55; G11B 5/596–5/59605; G11B 5/59622; G11B 5/59694; G11B 19/04–19/042; G11B 19/046
USPC ...... 360/31, 53, 55, 60, 69, 75, 77.03, 78.11
See application file for complete search history.

(56) References Cited

U.S. PATENT DOCUMENTS

| 5,663,847 | A | 9/1997 | Abramovitch | |
|---|---|---|---|---|
| 6,011,415 | A | 1/2000 | Hahn et al. | |
| 6,115,200 | A | 9/2000 | Allen et al. | |
| 6,414,813 | B2 | 7/2002 | Cvancara | |
| 6,429,990 | B2 | 8/2002 | Serrano et al. | |
| 6,496,320 | B1 | 12/2002 | Liu | |
| 6,710,966 | B1 | 3/2004 | Codilian et al. | |
| 6,900,958 | B1 | 5/2005 | Yi et al. | |
| 6,914,743 | B1 | 7/2005 | Narayana et al. | |
| 6,958,882 | B2 | 10/2005 | Kisaka | |
| 7,091,894 | B2 | 8/2006 | Fudge et al. | |
| 7,154,690 | B1 | 12/2006 | Brunnett et al. | |
| 7,345,841 | B2 | 3/2008 | Baugh et al. | |
| 7,471,483 | B1* | 12/2008 | Ferris .................. | G11B 5/5565 360/75 |
| 7,564,236 | B1* | 7/2009 | Call ...................... | B82Y 25/00 324/210 |
| 8,179,626 | B1* | 5/2012 | Ryan .................... | G11B 19/042 360/60 |
| 8,315,006 | B1* | 11/2012 | Chahwan ............. | G11B 19/042 360/60 |

(Continued)

*Primary Examiner* — Wayne Young
*Assistant Examiner* — James L Habermehl (57) ABSTRACT

A data storage device is disclosed comprising a head actuated over a disk, and a sensor configured to generate a sensor signal representing at least one of a shock and a thermal popping affecting the data storage device. The sensor signal is first filtered based on a first frequency range corresponding to the shock to generate a shock signal, and second filtered based on a second frequency range corresponding to the thermal popping to generate a pop signal, wherein the second frequency range is different from the first frequency range. The shock signal and the pop signal are individually processed, for example, to log a disturbance event, to abort a write operation, or to generate a feed-forward servo compensation signal.

24 Claims, 5 Drawing Sheets

(56) References Cited

U.S. PATENT DOCUMENTS

| | | | |
|---|---|---|---|
| 8,767,332 B1 * | 7/2014 | Chahwan | G11B 19/042 360/60 |
| 8,947,819 B1 | 2/2015 | Ferris et al. | |
| 9,242,340 B1 * | 1/2016 | Moravec | B24B 37/048 |
| 2013/0114162 A1 | 5/2013 | Zhang et al. | |

* cited by examiner

DATA STORAGE DEVICE FILTERING SENSOR SIGNAL TO OPTIMIZE SHOCK AND THERMAL POP DETECTION

BACKGROUND

Data storage devices such as disk drives may comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the actuator arm as it seeks from track to track.

Figure 1:
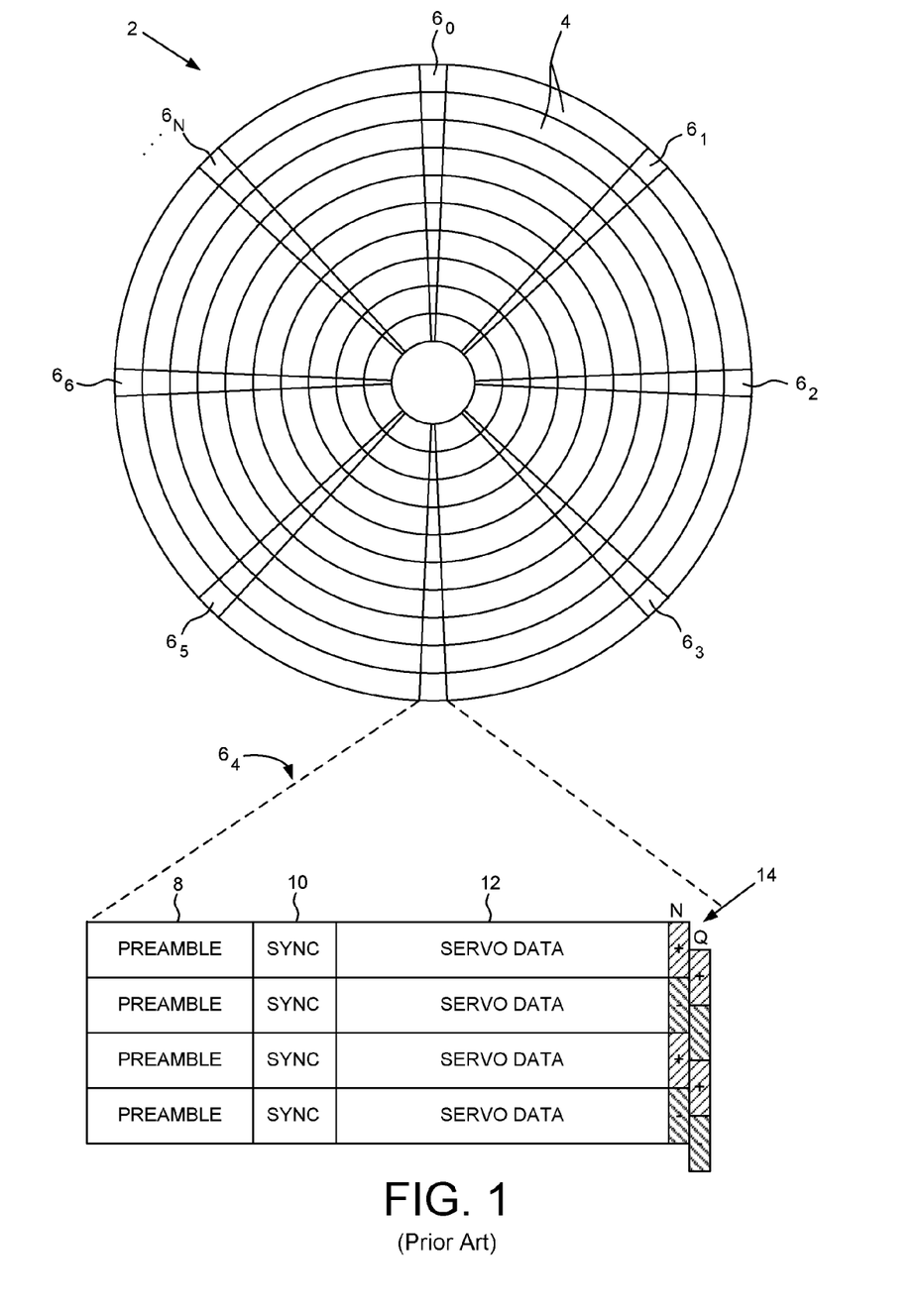
FIG. 1 shows a prior art disk format comprising a plurality of tracks defined by servo sectors.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
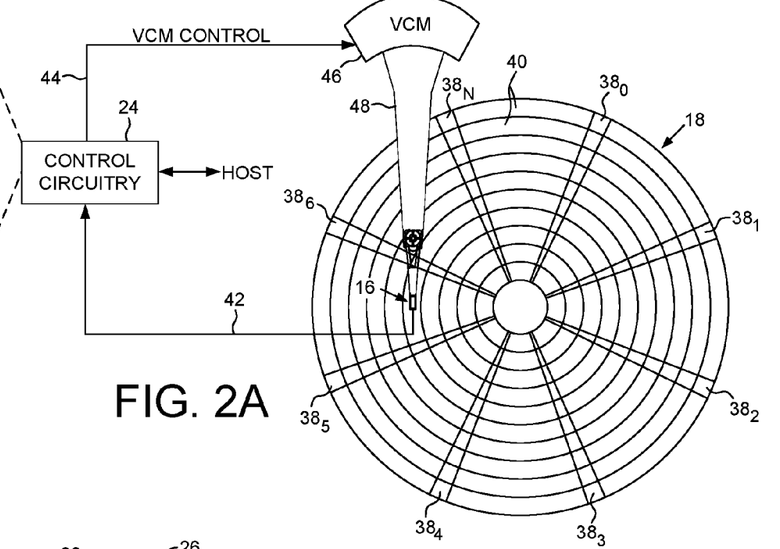
FIG. 2A shows a data storage device in the form of a disk drive according to an embodiment comprising a head actuated over a disk.

FIG. 2A shows a data storage device in the form of a disk drive according to an embodiment comprising a head 16 actuated over a disk 18, and a sensor 20 (FIG. 2B) configured to generate a sensor signal 22 representing at least one of a shock and a thermal popping affecting the data storage device. The disk drive further comprises control circuitry 24 including a first shock filter 26 and a second pop filter 28, wherein the control circuitry 24 is configured to execute the flow diagram of FIG. 2C. The sensor signal generated by the sensor (block 30) is first filtered using the shock filter based on a first frequency range corresponding to the shock to generate a shock signal (block 32), and second filtered using the pop filter based on a second frequency range corresponding to the thermal popping to generate a pop signal (block 34), wherein the second frequency range is different from the first frequency range. The shock signal and the pop signal are individually processed, for example, to log a disturbance event, to abort a write operation, or to generate a feed-forward servo compensation signal (block 36).

In the embodiment of FIG. 2A, the disk 18 comprises a plurality of servo sectors $38_0$-$38_N$ that define servo tracks 40, wherein the servo sectors $38_0$-$38_N$ may comprise any suitable head position information, such as a track address for coarse positioning and servo bursts for fine positioning. The servo bursts may comprise any suitable pattern, such as an amplitude based servo pattern or a phase based servo pattern (FIG. 1). Data tracks may be defined relative to the servo tracks 40 at the same or different radial density. The control circuitry 24 processes a read signal 42 emanating from the head 16 to demodulate the servo sectors $38_0$-$38_N$ and generate a position error signal (PES) representing an error between the actual position of the head and a target position relative to a target track. A servo control system in the control circuitry 24 filters the PES using a suitable compensation filter to generate a control signal 44 applied to a voice coil motor (VCM) 46 which rotates an actuator arm 48 about a pivot in order to actuate the head 16 radially over the disk 18 in a direction that reduces the PES.

During operation of the disk drive, it may be desirable to detect disturbances affecting the disk drive in order to, for example, log the occurrence of the disturbances for subsequent failure analysis, or compensate for the disturbances in real time. A disturbance may be compensated in any suitable manner, such as by aborting a write operation or generating a feed-forward servo compensation signal that modifies operation of the servo control system, thereby maintaining the head over the target data track during an access operation (read or write). Example disturbances that may affect the disk drive include a shock disturbance caused by, for example, an external physical bumping or vibration affecting the disk drive, and a thermal popping disturbance which may be caused by a mismatch of coefficients of thermal expansion of various materials used to manufacture the disk drive.

In one embodiment, a disturbance affecting the disk drive may manifest at different frequency ranges and different magnitudes depending on the type of disturbance. For example, a shock disturbance may exhibit a larger magnitude and at a lower frequency than a thermal popping disturbance. Accordingly, in one embodiment the sensor signal 22 generated by the sensor 20 (FIG. 2B) is filtered using at least a shock filter 26 based on a first frequency range and gain that correlates with the occurrence of shock disturbances, and a pop filter 28 based on a second frequency range and gain that correlates with the occurrence of thermal popping disturbances. In this manner, the signal-to-noise ratio (SNR) may be optimized for each type of disturbance being detected. For example, when logging disturbance events it may be desirable to accurately distinguish between the types of disturbances so as to improve failure analysis. In other embodiments, accurately distinguishing between the types of disturbances may reduce the number of write aborts and/or improve feed-forward compensation of the servo control system. Any suitable sensor 20 may be employed in the embodiments disclosed herein, such as a sensor comprising a suitable piezoelectric element or any suitable transducer element.

Figure 3:
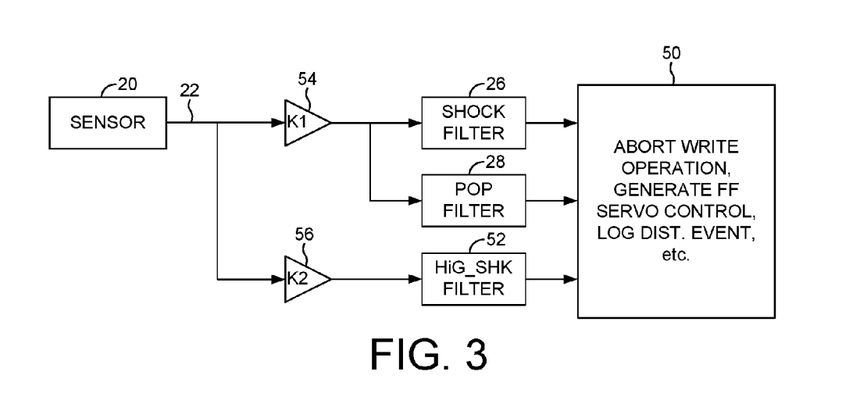
FIG. 3 shows control circuitry according to an embodiment further configured to third filter the sensor signal based on a third frequency range corresponding to an acceleration event affecting the data storage device to generate a high-shock signal.

FIG. 3 shows control circuitry according to an embodiment wherein an additional disturbance may be detected due to an acceleration event affecting the disk drive due, for example, to the disk drive being dropped. The control circuitry may respond at block 50 to a detected acceleration event in any suitable manner, such as by logging the detected disturbance for failure analysis, generating a feed-forward servo compensation signal, performing a write abort, and/or determining the length of time that write operations should be disabled based on the magnitude and/or frequency of the detected acceleration event. In the embodiment of FIG. 3, a HiG shock filter 52 is employed having a frequency response and gain that correlates with the occurrence of acceleration events.

FIG. 3 also illustrates an embodiment wherein the control circuitry comprises a first amplifier K1 54 configured to amplify the sensor signal 22 and thereby affect the gain of both the shock filter 26 and the pop filter 28, as well as a second amplifier K2 56 configured to amplify the sensor signal 22 and thereby affect the gain of the HiG shock filter 52. This embodiment may reduce the cost and/or increase the speed of the control circuitry by advantageously using a single amplifier K1 54 to affect the gain of at least two of the disturbance filters. For example, in an embodiment wherein the amplifiers K1 and K2 of FIG. 3 are implemented as discrete components (analog or digital), there is a reduction in component cost due to the sharing of the amplifier K1 54 for both the shock filter 26 and the pop filter 28. In an embodiment where the amplification and filtering of FIG. 3 may be performed by a microprocessor executing instructions, sharing the amplification K1 54 may increase the speed of the filtering functions. In one embodiment, each of the disturbance filters may have an internal gain in addition to an external amplifier so as to further customize the filtering functions to match the respective disturbances. For example, in the embodiment of FIG. 3 each of the shock filter 26 and the pop filter 28 may have an internal gain in addition to the gain of amplifier K1 54, where the overall gain of each filter is represented by the product of the amplifier K1 54 gain and the internal gain of each filter.

Figure 4:
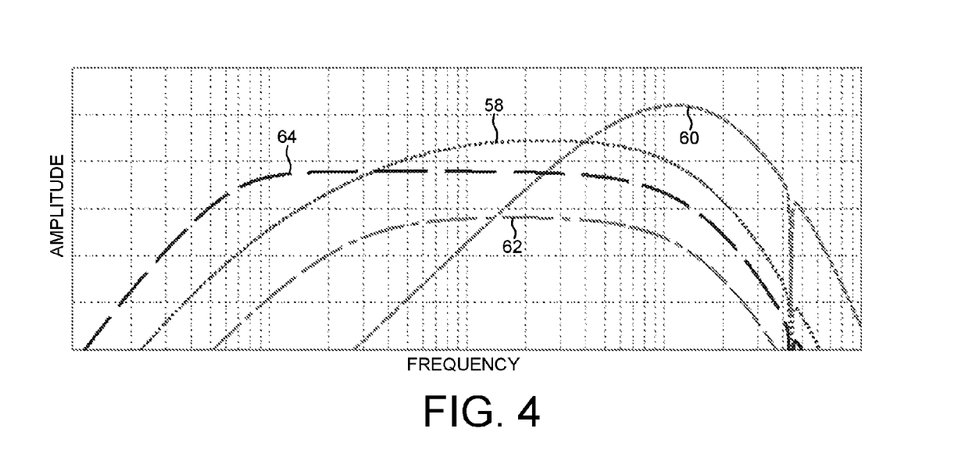
FIG. 4 shows frequency responses of multiple filters for filtering the sensor signal according to an embodiment, wherein a gain of at least two of the filters is affected by the same amplifier.

In the various embodiments, any suitable number of filters may be employed for filtering the sensor signal 22 that are each matched to a type of disturbance or optimized for a particular function. For example, one embodiment may employ a feed-forward filter for filtering the sensor signal 22 to generate a feed-forward servo compensation signal. FIG. 4 shows example frequency responses of various filters, including frequency response 58 of the shock filter 26, frequency response 60 of the pop filter 28, frequency response 62 of the HiG filter 52, and frequency response 64 of a feed-forward filter (not shown). In the embodiment of FIG. 4, the frequency range of the shock frequency response 58 spans lower frequencies than the pop frequency response 60 since shock disturbances may manifests at lower frequencies. Additionally in this embodiment, the gain of the shock filter 26 and corresponding frequency response 58 is lower than the gain of the pop filter 28 and corresponding frequency response 60 since shock disturbances may manifest with a higher magnitude. This embodiment better matches the filter frequency responses to the respective disturbances even though the frequency ranges of the frequency response may at least partially overlap as illustrated in FIG. 4.

Figure 5:
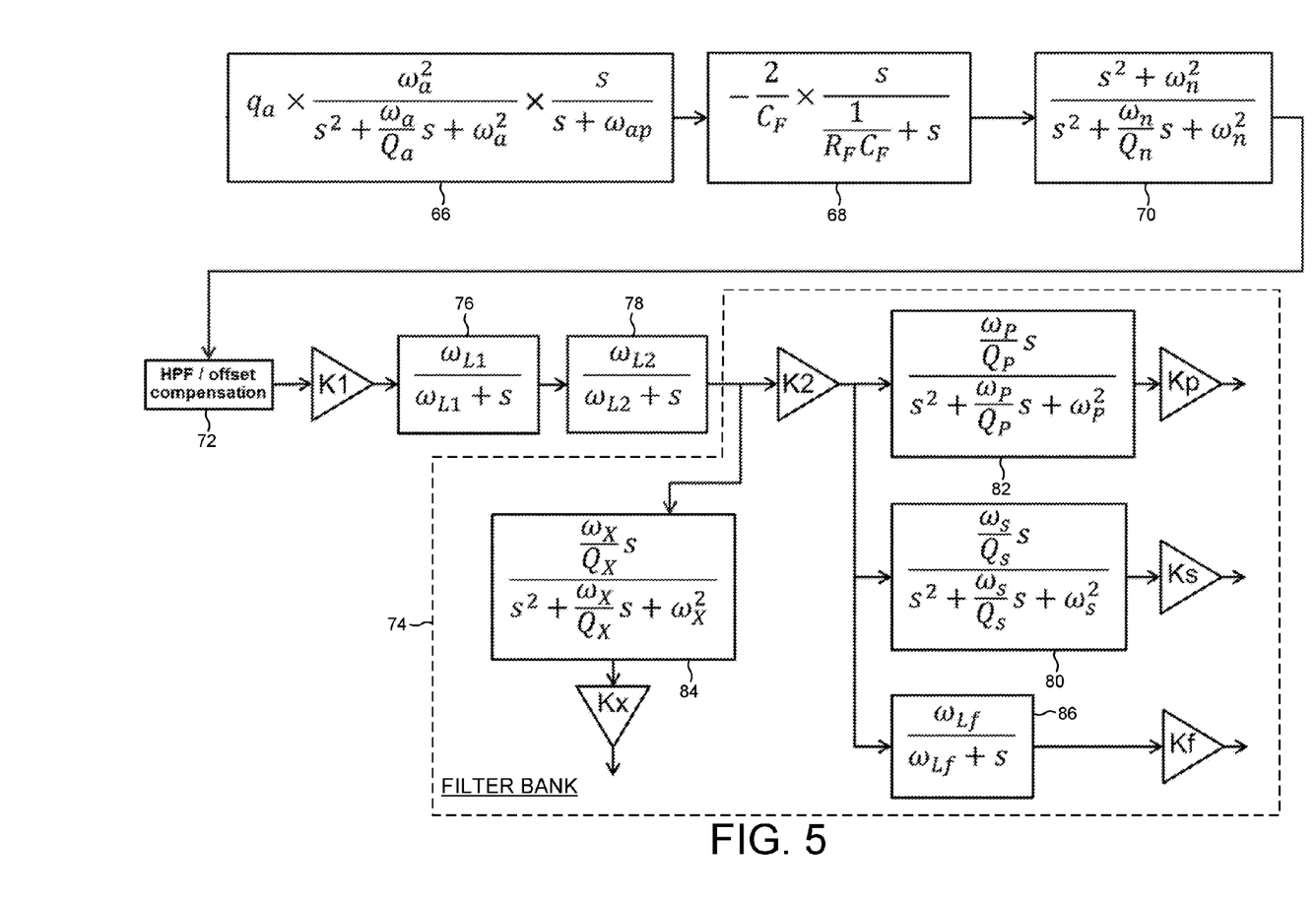
FIG. 5 shows an embodiment wherein the control circuitry comprises four filters configured to filter the sensor signal over different frequency ranges.

FIG. 5 shows a mathematical representation of control circuitry according to an embodiment, wherein the signal processing blocks shown may be implemented in continuous time (analog circuitry), discrete time (digital circuitry), or a combination of both. Some or all of the signal processing blocks may also be implemented by a microprocessor executing instructions. In the embodiment of FIG. 5, block 66 represents a model of the sensor 20, block 68 represents a model of a gain stage of a charge amplifier, block 70 represents a model of a notch filter, and block 72 performs any suitable high-pass filtering and offset compensation. Amplifier K1 and low-pass filters 76 and 78 perform precondition processing, and filter bank 74 comprising various disturbance filters, such as block 80 representing a model for an embodiment of the shock filter 26, block 82 representing a model for an embodiment of the pop filter 28, block 84 representing a model for an embodiment of the HiG shock filter 52, and block 86 representing a model for an embodiment of a feed-forward filter. Any suitable values may be assigned to the variables shown in FIG. 5 in order to achieve the desired frequency response for the filters, such as the frequency responses shown in FIG. 4.

Figure 2B:
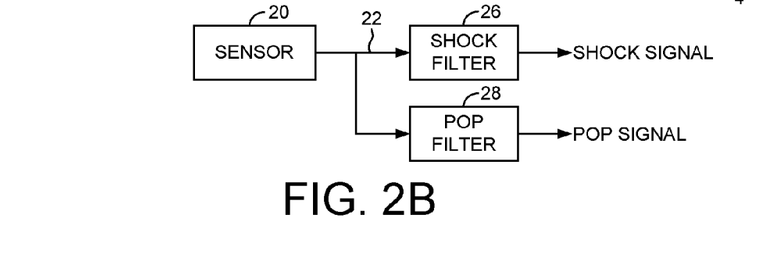
FIG. 2B shows control circuitry according to an embodiment comprising a sensor configured to generate a sensor signal representing at least one of a shock and a thermal popping affecting the data storage device, a first filter configured to filter the sensor signal based on a first frequency range corresponding to the shock to generate a shock signal, and a second filter configured to second filter the sensor signal based on a second frequency range corresponding to the thermal popping to generate a pop signal.
Figure 2C:
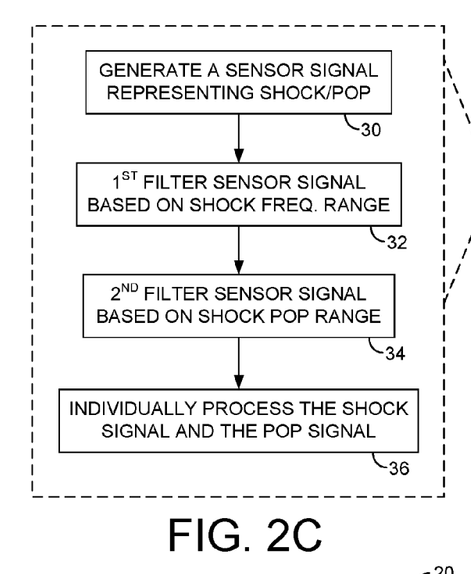
FIG. 2C is a flow diagram according to an embodiment executed by control circuitry configured to perform the first filtering and the second filtering of the sensor signal.
Figure 6:
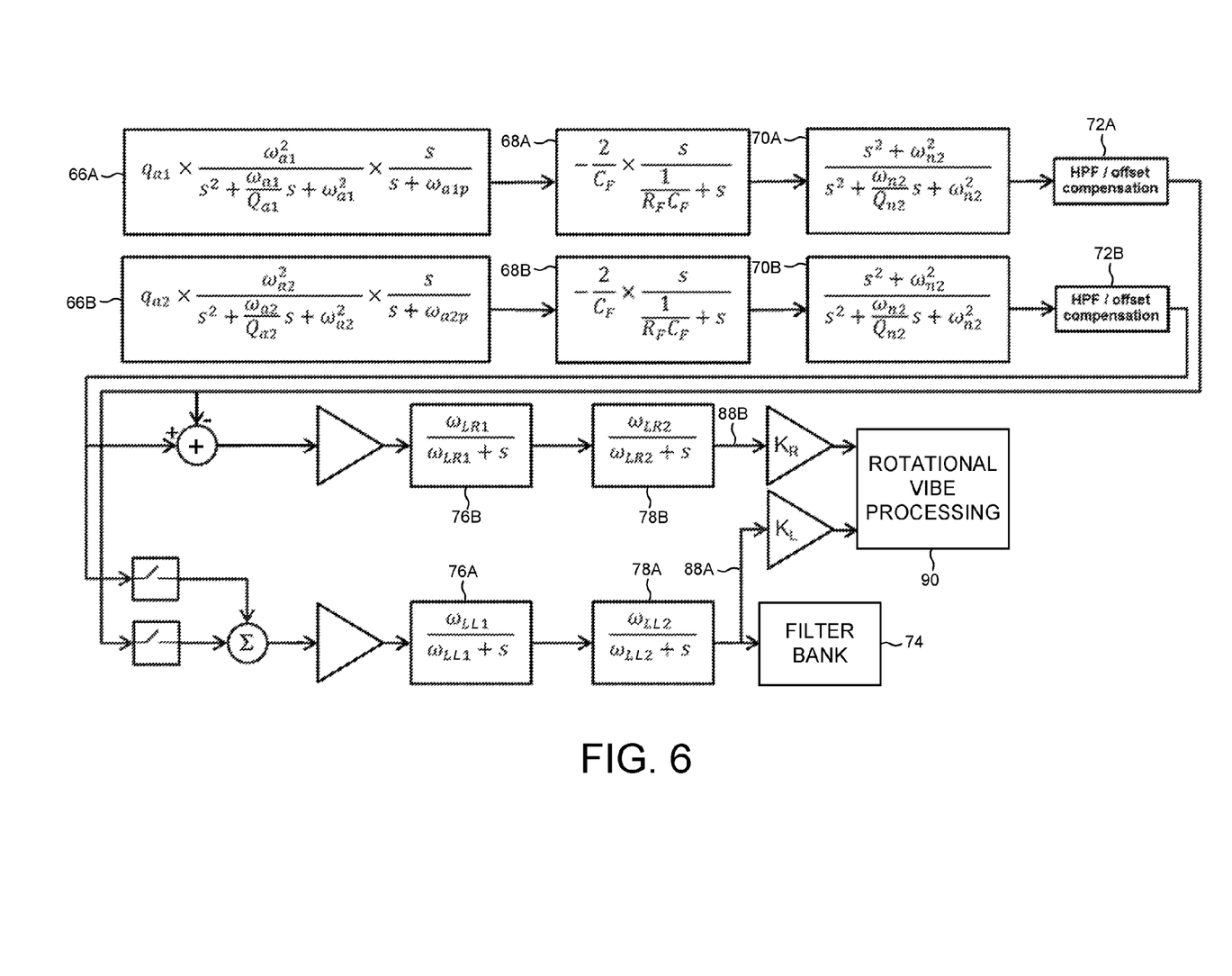
FIG. 6 shows an embodiment wherein the senor comprises at least two vibe sensors configured to detect a rotational acceleration of the data storage device.

FIG. 6 shows a mathematical representation of control circuitry according to an embodiment wherein the sensor 20 of FIG. 2B may comprise two vibe sensors each represented by the model blocks 66A and 66B. In this embodiment, a sum signal 88A is generated by summing the outputs of the two vibe filters, and a difference signal 88B is generated as a difference between the outputs of the two vibe filters. The sum signal 88A and the difference signal 88B are processed at block 90 in order to perform any suitable rotational vibration processing, such as detecting/logging a rotational disturbance, aborting a write operation, or generating a feed-forward servo compensation signal. In this embodiment, the sum signal 88A is also processed by the bank of disturbance filters 74 in order to detect/log and/or compensate for other types of disturbances, such as shock and pop. This embodiment may reduce cost and/or complexity by advantageously utilizing already existing vibe sensors 66A and 66B employed for rotational vibration as the sensor 20 for detecting and processing other types of disturbances, such as shock and pop.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk;
   a head actuated over the disk;
   a sensor configured to generate a sensor signal representing at least one of a shock and a thermal popping affecting the data storage device; and
   control circuitry configured to:
      first bandpass filter the sensor signal based on a first frequency range corresponding to the shock to generate a shock signal;
      second bandpass filter the sensor signal based on a second frequency range corresponding to the thermal popping to generate a pop signal, wherein the second frequency range is different from the first frequency range; and
      individually process the shock signal and the pop signal.

2. The data storage device as recited in claim 1, wherein the control circuitry is further configured to compensate for the at least one of the shock and the thermal popping by aborting a write operation.

3. The data storage device as recited in claim 1, wherein the control circuitry is further configured to compensate for the at least one of the shock and the thermal popping by generating a feed-forward servo compensation signal in response to at least one of the shock signal and the pop signal.

4. The data storage device as recited in claim 1, wherein at least part of the first frequency range is lower than the second frequency range.

5. The data storage device as recited in claim 1, wherein at least part of the first frequency range overlaps with at least part of the second frequency range.

6. The data storage device as recited in claim 1, wherein a gain of the first bandpass filtering is less than a gain of the second bandpass filtering.

7. The data storage device as recited in claim 1, wherein the control circuitry is further configured to:
   third bandpass filter the sensor signal based on a third frequency range corresponding to an acceleration event affecting the data storage device to generate a high-shock signal, wherein the third frequency range is different from the first frequency range and the second frequency range; and
   individually process the high-shock signal.

8. The data storage device as recited in claim 7, wherein the control circuitry comprises:
   a first amplifier configured to affect a gain of the first bandpass filtering and the second bandpass filtering; and
   a second amplifier configured to affect a gain of the third bandpass filtering.

9. A method of operating a data storage device, the method comprising:
   actuating a head over a disk;
   generating a sensor signal representing at least one of a shock and a thermal popping affecting the data storage device;
   first bandpass filtering the sensor signal based on a first frequency range corresponding to the shock to generate a shock signal;
   second bandpass filtering the sensor signal based on a second frequency range corresponding to the thermal popping to generate a pop signal, wherein the second frequency range is different from the first frequency range; and
   individually processing the shock signal and the pop signal.

10. The method as recited in claim 9, further comprising compensating for the at least one of the shock and the thermal popping by aborting a write operation.

11. The method as recited in claim 9, further comprising compensating for the at least one of the shock and the thermal popping by generating a feed-forward servo compensation signal in response to at least one of the shock signal and the pop signal.

12. The method as recited in claim 9, wherein at least part of the first frequency range is lower than the second frequency range.

13. The method as recited in claim 9, wherein at least part of the first frequency range overlaps with at least part of the second frequency range.

14. The method as recited in claim 9, wherein a gain of the first bandpass filtering is less than a gain of the second bandpass filtering.

15. The method as recited in claim 9, further comprising:
    third bandpass filtering the sensor signal based on a third frequency range corresponding to an acceleration event affecting the data storage device to generate a high-shock signal, wherein the third frequency range is different from the first frequency range and the second frequency range; and
    individually processing the high-shock signal.

16. The method as recited in claim 15, wherein:
    a first amplifier affecting a gain of the first bandpass filtering and the second bandpass filtering; and
    a second amplifier affecting a gain of the third bandpass filtering.

17. Control circuitry for use in a data storage device comprising a head actuated over a disk and a sensor configured to generate a sensor signal representing at least one of a shock and a thermal popping affecting the data storage device, wherein the control circuitry is configured to:
    first bandpass filter the sensor signal based on a first frequency range corresponding to the shock to generate a shock signal;
    second bandpass filter the sensor signal based on a second frequency range corresponding to the thermal popping to generate a pop signal, wherein the second frequency range is different from the first frequency range; and
    individually process the shock signal and the pop signal.

18. The control circuitry as recited in claim 17, further configured to compensate for the at least one of the shock and the thermal popping by aborting a write operation.

19. The control circuitry as recited in claim 17, further configured to compensate for the at least one of the shock and the thermal popping by generating a feed-forward servo compensation signal in response to at least one of the shock signal and the pop signal.

20. The control circuitry as recited in claim 17, wherein at least part of the first frequency range is lower than the second frequency range.

21. The control circuitry as recited in claim 17, wherein at least part of the first frequency range overlaps with at least part of the second frequency range.

22. The control circuitry as recited in claim 17, wherein a gain of the first bandpass filtering is less than a gain of the second bandpass filtering.

23. The control circuitry as recited in claim 17, further configured to:
    third bandpass filter the sensor signal based on a third frequency range corresponding to an acceleration event affecting the data storage device to generate a high-shock signal, wherein the third frequency range is different from the first frequency range and the second frequency range; and
    individually process the high-shock signal.

24. The control circuitry as recited in claim 23, wherein the control circuitry comprises:
    a first amplifier configured to affect a gain of the first bandpass filtering and the second bandpass filtering; and
    a second amplifier configured to affect a gain of the third bandpass filtering.

* * * * *